Figure 1:
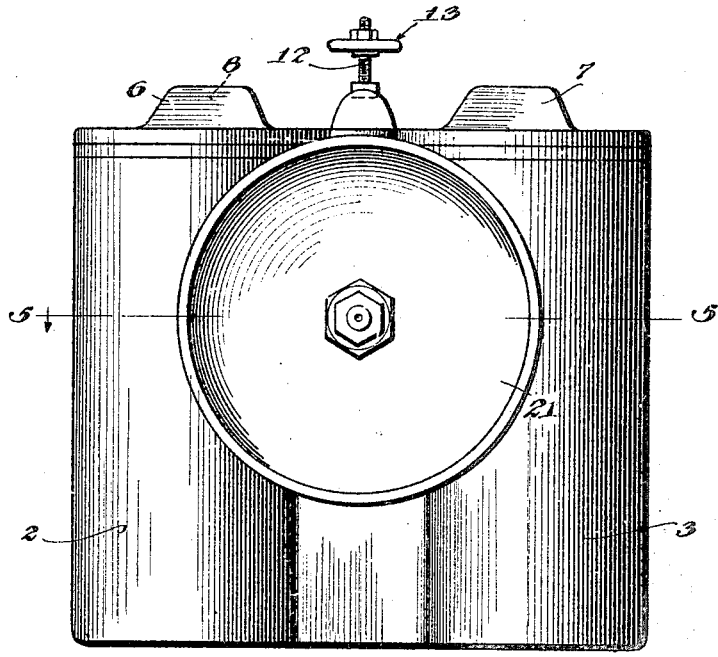

Nov. 27, 1928.

W. PROCKTER

CARBIDE LAMP

Filed Jan. 8, 1927

1,693,463

3 Sheets-Sheet 1

INVENTOR
Walter Prockter,
BY
ATTORNEYS

Nov. 27, 1928.
W. PROCKTER
CARBIDE LAMP
Filed Jan. 8, 1927
1,693,463
3 Sheets-Sheet 2
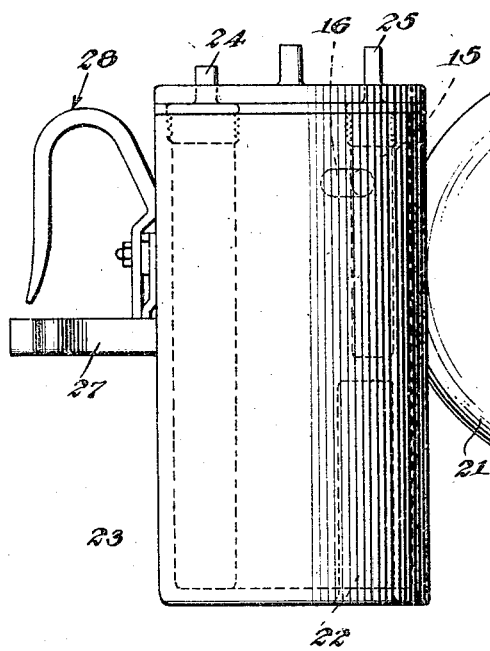
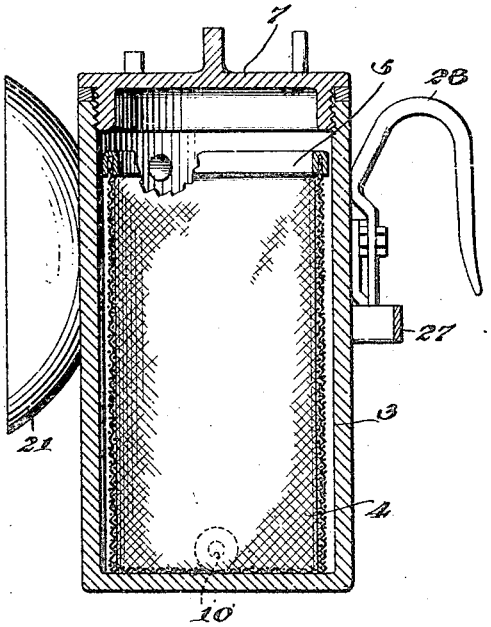
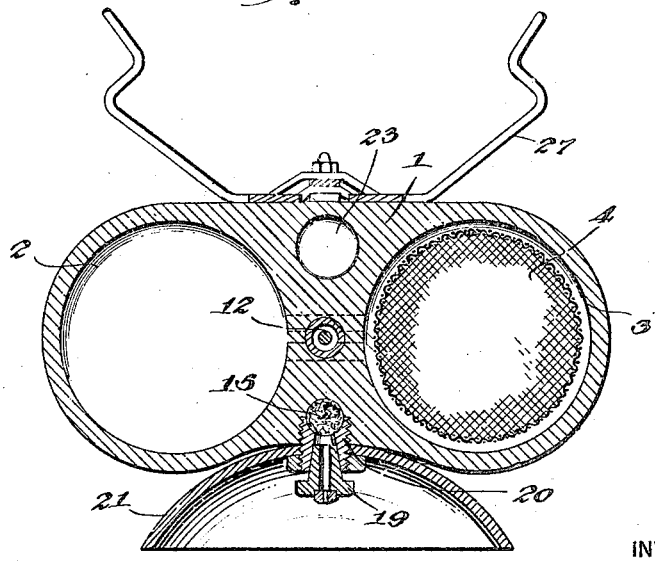
INVENTOR
Walter Prockter.
BY
ATTORNEYS Nov. 27, 1928.
W. PROCKTER
CARBIDE LAMP
Filed Jan. 8, 1927
1,693,463
3 Sheets-Sheet 3
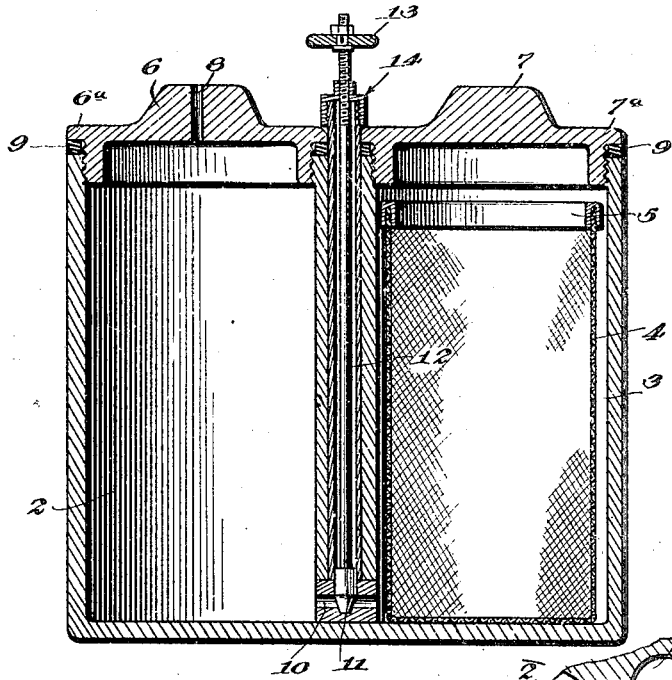
Fig. 6.
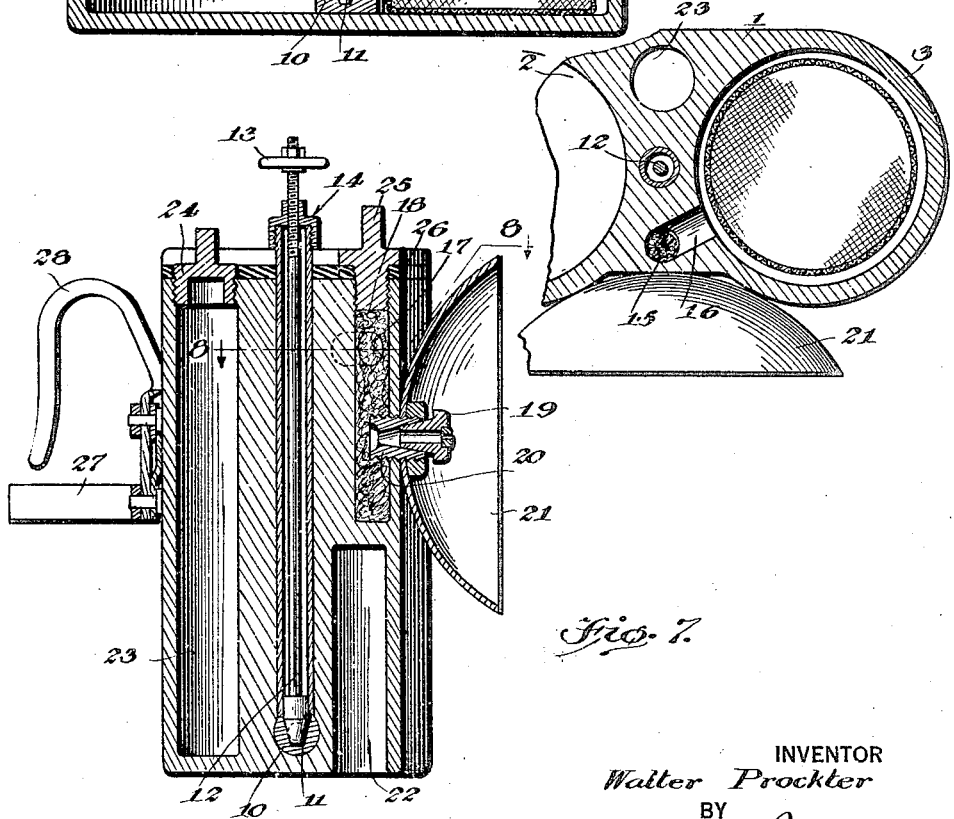
Fig. 8.
Fig. 7.
INVENTOR
*Walter Prockter*
BY
ATTORNEYS Patented Nov. 27, 1928.

1,693,463

UNITED STATES PATENT OFFICE.

WALTER PROCKTER, OF HUNTINGTON, WEST VIRGINIA.

CARBIDE LAMP.

Application filed January 8, 1927. Serial No. 159,956.

This invention relates to miners' lamps of the acetylene gas or carbide type. The carbide lamp in ordinary use is made with the chambers arranged in superposed relation, the carbide chamber being in the bottom with a gas filter over said chamber, while the water compartment is located at the top of the lamp from which water flows onto the carbide through a tube that perforates the filter.

A primary object of the invention is to so construct a compact lamp of this character in which the functioning parts will be easily accessible with the added feature of a container for accessories.

Another object of the invention is to provide a carbide lamp in which the amount of surface of the felt packing or filtering material exposed to the deleterious effect of the carbide and water mixture is reduced to a minimum thereby prolonging the life of the filtering material.

In carrying out these objects the invention is susceptible of modifications without departing from the spirit and sacrificing any of the advantages of the claimed invention there being shown in the drawings for illustrative purposes a preferred and practical form, in which:—

Figure 2:
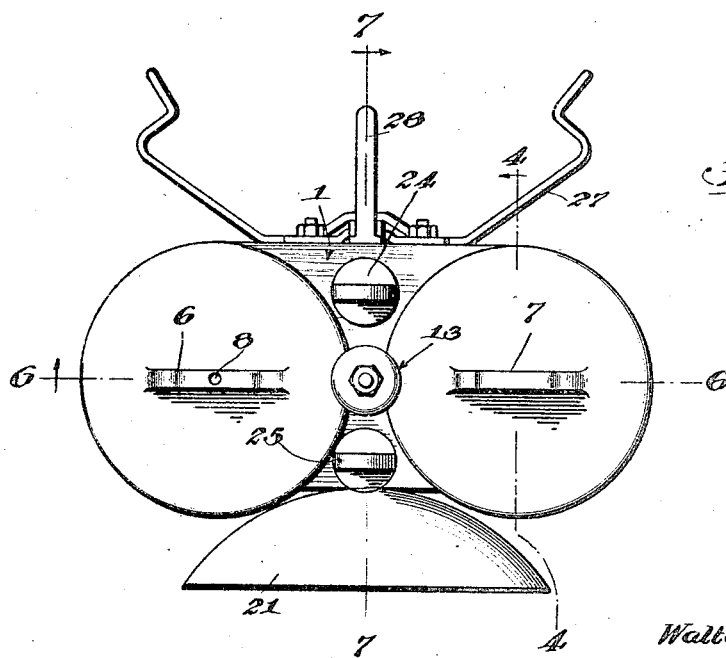

Figure 1 represents a front elevation of the lamp constructed in accordance with this invention, Figure 2 is a top plan view thereof, Figure 3 is a side elevation, Figure 4 is a vertical transverse section through the carbide chamber taken on the line 4—4 of Fig. 2, Figure 5 is a horizontal section taken on the line 5—5 of Fig. 1, Figure 6 is a longitudinal vertical section taken on the line 6—6 of Fig. 2, Figure 7 is a transverse central vertical section taken on the line 7—7 of Fig. 2, and Figure 8 is a detail horizontal section taken on the line 8—8 of Fig. 7.

Similar reference characters indicate corresponding parts in all the figures.

In the embodiment illustrated the lamp constituting this invention comprises a solid body member 1 in the form of a casting preferably made of aluminum or other light weight material and which has arranged at opposite sides thereof chambers 2 and 3 which are preferably of the same size and shape, being here shown circular in cross section, and which are preferably made integral with the body 1. These chambers 2 and 3, one of which is designed as a water container and the other as a carbide holder, are internally threaded at their upper ends to receive cap-like covers 6 and 7 which have overlying flanges 6ª and 7ª between which and the edges of the chambers are arranged gaskets 9. The chamber 2 which is the water chamber has an air vent 8 in its top 6, while the top 7 of the carbide chamber is made fluid tight. A small conduit 10 extends transversely through the body 1 and connects the chambers 2 and 3 for supplying water from chamber 2 to the carbide. The conduit is controlled by a valve 11 operating transversely of the conduit and having a stem 12 extending upwardly through the body and provided at its upper end with an operating wheel 13 to provide for the convenient manipulation of the valve. A water tight bushing 14 surrounds the valve stem at its upper end to permit its turning. Mounted in the carbide chamber 3 is a removable basket like container 4 made of suitable foraminous material preferably of #30 screen wire. This container 4 is cup like in form and is provided at its upper edge with a reinforcing band 5 shown U-shaped in cross section and which fits snugly over the edge of the wire cup and is secured thereto by soldering or in any other suitable manner.

Extending longitudinally down from the top of the body 1 is a gas chamber 15 which terminates little below the mid center of the body and is connected at its upper end with the carbide chamber 3 by a passage 16 at the entrance of which is arranged a filtering packing 17. The chamber 15 is preferably filled with a filtering material in the form of a filter packing 18 through which the gas from the carbide chamber is filtered before it reaches the burner 19, which is connected by a bushing 20 with the chamber 15. A reflector 21 surrounds the burner 19 as is usual in devices of this character.

Below the gas chamber 15 is an upwardly extending socket 22 which opens through the bottom of the lamp and is designed to receive a support for the lamp which may be in the form of a post or similar device.

An accessory containing chamber 23 extends from the top to the bottom of the body 1 between the chambers 2 and 3 and in rear of the valve stem 12. This chamber 23 is equipped with a removable top 24, a similar top 25 being provided for the gas chamber and having arranged between its overlying flange and the body 1, a gasket 26 to insure a fluid tight joint at this point.

A suitable bracket 27 is secured to the rear wall of the body 1 and an attaching hook 28 is also mounted in said body above said bracket and may be used for mounting the lamp on the miner's cap, his belt, or other suitable support.

From the above description it will be obvious that a lamp constructed as herein shown and described will be compact and permit all of the functioning parts to be accessible for repairs or otherwise and which also furnishes an extra compartment holding accessories such as tip reamers, extra burners and the like. Moreover the arrangement here shown eliminates the exposure of the filtering material to the water and carbide mixture which is objectionable, in that it decomposes the filtering material. In this device the filtering material is used for the passage of the gas therethrough only.

Without further description it is thought that the features and advantages of the invention will be readily apparent to those skilled in the art and it will, of course, be understood that changes in the form, proportions and minor details of construction may be resorted to without departing from the spirit of the invention or its scope as claimed.

I claim:—

The combination with an acetylene gas lamp, of a body member in the form of a solid casting with upright closed chambers arranged side by side to provide a water container and a carbide holder, a conduit connecting the lower ends of said chambers, a valve for controlling said conduit, a stem attached to said valve and extending upwardly between said chambers through the top of said casting, a foraminous carbide basket mounted in said carbide holder, a gas chamber formed in said casting with a passage connecting it with the carbide chamber, filtering material located in said gas chamber at the entrance of said passage, and a burner connected with said gas chamber.

WALTER PROCKTER.